United States Patent Office

2,816,114
Patented Dec. 10, 1957

2,816,114

PRODUCTION OF IMPROVED ORGANIC PIGMENTS

Felix Frederick Ehrich, New York, N. Y., and Arthur J. Stratton, West Orange, N. J., assignors to E. I. du Pont de Nemours & Company, Wilmington, Del., a corporation of Delaware No Drawing. Application August 31, 1953, Serial No. 377,720

8 Claims. (Cl. 260—314.5)

This invention relates to the production of improved organic pigments and more particularly to novel methods for conditioning organic pigments requiring particle size reduction in order to impart acceptable pigmentary properties thereto.

Many organic colored pigments obtained by the ordinary well-known methods of synthesis are in a crystalline form wherein most of the crystals have dimension in the order of 5-25 microns in length, whereas to be useful as pigments they must exhibit an average range below about 1.0 micron and preferably below about 0.1-0.2 micron. Examples of such pigments include the phthalocyanine series of pigments and the vat dyes, whether used directly as pigments or as textile dyes. Numerous methods have been proposed for reducing the particle size of such pigments to the range specified, including:

(1) *Acid pasting.*—Wherein the crude pigment is dissolved in a large amount of concentrated sulfuric acid (or chlor sulfonic acid in some cases) and is reprecipitated by dilution of the acid with water. When properly done, this process results in a pigment of desired small particle size and high tinctorial strength. This process has certain disadvantages in that the pigment is sensitive, first to the temperature of the solution, for high temperatures may result in sulfonation of the pigment, and secondly, it is profoundly influenced by the conditions of dilution with water. A further, most serious disadvantage in the method arises from the cost of the large amount of acid required (about 10 parts per part of pigment) and from the problems of disposal of the acid in the liquors resulting when the pigment is filtered from the drowning bath.

(2) *Salt Milling.*—In this treatment the pigment is charged into a dry ball mill together with from 4-10 parts of a dry inorganic salt, such as NaCl and the mixture is milled for about 24-48 hours. The product is then discharged from the mill to remove the salt by solution in water and filtration. This method also gives small particle size product of high tinctorial strength. However, it too has serious disadvantages. For instance, the grinding charge is very sensitive to small amounts of water which may cause serious packing in the mill and prevent further grinding action. Discharging the mill entails a very dusty operation and the concentrated sodium chloride solutions usually found in the extraction process are highly corrosive toward plant equipment. Furthermore, as is universally recognized, ball mills used in dry milling operations require excessive maintenance as compared to wet ball milling operations. After numerous tests and experiments, no other equipment has been found successful in salt milling pigments.

(3) *Solvent milling.*—Recently, it has been found that effective particle size reduction can be brought about in a wet ball milling operation if the liquid used is an organic solvent such as acetone, isopropyl alcohol or, in some cases, a hydrocarbon such as xylene or a chlorinated hydrocarbon such as carbon tetrachloride. This method is critical as to the ball size and, when properly done, also gives products of excellent tinctorial strength. However, it too has several disadvantages. Most of the practical solvents are either inflammable, or toxic, or both, and create serious fire and health hazards in large scale usage. Also, both for economy and for safety, elaborate and expensive recovery systems are required and the use of such solvents adds a substantial item of cost to the operations.

It is well known that inorganic calcined pigments, such as titanium dioxide, can be milled in water to reduce their particle size. However, the grinding or ball milling of organic pigments, such as phthalocyanines, in water affords very unsatisfactory results. These pigments are very hydrophobic, are not effectively wet by pure water, and the wet milling, disadvantageously, may actually reduce rather than enhance the tinctorial strength of the final product. The addition of wetting or dispersing agents in such a milling operation fails to give the desired small particle size.

A real need thus exists for an attractive wet milling in water operation wherein pigment particle size can be effectively reduced without incurring disadvantageous loss in pigment tinctorial and other properties, and which is free from the serious waste disposal problems connected with prior acid pasting, the dusting and corrosion problems of salt milling, the fire and toxicity hazards of solvent milling, and use of expensive solvent recovery systems. A salient object of the invention is to provide such an operation and one which is free from these and other disadvantages which have characterized prior pigment particle size reducing systems. A further, specific object of the invention is to provide a new, improved, more economical method for effecting particle size reduction of colored, organic pigments and dyes. Other objects and advantages of the invention will be evident from the ensuing description.

These objects are attained in this invention by subjecting a mixture of a water-insoluble pigment or dye and a finely divided inorganic salt, while suspended in a saturated aqueous solution of said salt, to high energy shear and impact treatment in the presence of a dispersing agent by means of a surface moving at a high rate of speed with respect to the body of liquid undergoing treatment.

In a more specific and preferred embodiment, the invention comprises reducing the particle size of a colored, organic type pigmenting or dyeing substance by subjecting said substance to vigorous agitation in aqueous media containing a dispersing agent and borax, the latter being present in said media in an amount ranging from about 3-10 times the weight of said coloring substance.

In one preferred adaptation, the crude pigment, such as copper phthalocyanine, is mixed with powdered borax (3-10 times the weight of the pigment) and sufficient water, in which is dissolved a suitable dispersing agent, such as the condensation product of formaldehyde and naphthalene sulfonic acid (10% to 50% of the weight of the pigment), to give a stirrable mass under vigorous agitation. The mixture is then subjected to vigorous agitation for from 1 to 2 hours in a suitable, cylindrical type agitator vessel provided with a single, smooth agitator disc having a diameter more than about half the diameter of the vessel which is capable of being operated at peripheral speeds in excess of about 2000 ft. per min. The resulting pigment slurry is then diluted to about 3 times its volume with cold water, after which the undissolved borax settles rapidly and is separated as a sludge in condition suitable for reuse in the process, e. g., provides most of the borax and water for a subsequent charge. The pigment is then suitably isolated through flocculation, as by treatment with acid and a cationic agent, such as diphenyl guanidine, and is then filtered and washed. The pigment paste obtained comprises a highly desirable form of dispersed paste useful for coloring paper, coating compositions, aqueous emulsion paints, Portland cement compositions and the like. It can be converted to lakes for use in coloring linoleum and, when suitably modified, can be flushed into oil to high strength flushed pigment pastes.

To a clearer understanding of the invention, the following specific examples are given. These are merely illustrative and are not to be construed as limiting its underlying principles and scope:

Example 1

To a milling device comprising a cylindrical vessel 5 inches in diameter and arranged for external cooling, with an agitator centrally located therein with respect to its axis consisting of a single disc of 4½ inches diameter and 1/16 inch thickness mounted on a shaft adapted to be driven at about 2500 R. P. M., there are charged the following ingredients:

80 parts crude copper phthalocyanine, in powder form (such as that which is isolated from the reaction mass by the sulfation process of U. S. 2,602,800);
800 parts powdered borax ($Na_2B_4O_7.10H_2O$);
8 parts of a commercial dispersing agent comprising the polymerized condensation product of formaldehyde and naphthalene sulfonic acid;
325 parts water.

When the agitator is started, this mixture breaks down to a rather viscous slurry which exhibits a smooth vortex with a very rapid return of all particles to the zone of vigorous shear immediately adjacent to the disc. After a milling period of about 40 minutes, during which water as a cooling medium is circulated around the vessel, the charge is diluted with cold water to a volume of about 3000 ml., whereupon the borax settles rapidly in the absence of agitation while the well-dispersed pigment remains in suspension. The pigment suspension is readily decanted from the borax which comprises about 80% or more of the original charge of borax and is returnable to the vessel for reuse.

The pigment is flocculated and purified by adding sufficient sulfuric acid to give a pH of about 2.0 (about 90 parts of 96% $H_2SO_4$), heating to the boil, adding a solution of 5 parts diphenyl guanidine in dilute HCl, boiling 30 minutes, filtering and washing free of soluble salts. The pigment is retained in paste form and is highly useful as an aqueous dispersed paste for coloring paper in a beater dyeing operation, for making paper coating pastes such as with a casein binder, for coloring latex emulsion paints and the like, for coloring cement, and for conversion to lakes for coloring linoleum. By any of these functional tests for color value the product is superior to similar pastes prepared from copper phthalocyanine finished by any of the above prior art methods.

Example 2

An apparatus similar to that used in Example 1 but adapted for larger scale operation was employed in this example. It comprised a cylindrical tank of 130 gallons nominal capacity, 32 inches in diameter with a slightly rounded bottom, and jacketed for temperature control with cold water. A smooth disc 22 inches in diameter was mounted about 12 inches above the lowest point in the bottom of the vessel and on a shaft which was about 3 inches off center and adapted to rotate at about 800 R. P. M. The milling charge consisted of:

125 parts powdered crude copper phthalocyanine containing about 4.5% Cl and comprising about 70 mole percent of monochloro copper phthalocyanine and about 30 mole percent of copper phthalocyanine, obtained by reacting a mixture of 4-chloro phthalic acid and phthalic anhydride with urea and cupric chloride in suspension in deodorized kerosene and with ammonium molybdate as the catalyst in accordance with the procedures of U. S. 2,214,477, followed by isolation in accordance with the sulfation process disclosed in U. S. 2,602,800.

600 parts powdered borax
12 parts of the dispersing agent used in Example 1
280 parts water.

Following introduction of the charge, milling was continued for about 2 hours with a power consumption between about 20 H. P. and about 30 H. P. with good circulation of cooling water in the jacket. At the end of about 2 hours, the charge was diluted to about 350 gallons with cold water, well agitated and allowed to settle. The pigment remained dispersed in the water and could be decanted from the borax sludge. The pigment was flocculated by adding $H_2SO_4$ to a pH of about 2.0, heating to the boil and then adding 7 parts diphenyl guanidine as a 5% solution in dilute $H_2SO_4$, boiling for about 30 minutes, filtering and washing free of soluble salts. The resulting pigment paste had about 25–35% solids and readily broke down on vigorous agitation to a smooth, dispersed paste quite fluid even at 35% solids. A product equal to that of Example 1 in usefulness was obtained.

Example 3

The procedure of Example 1 was duplicated, except that instead of using 80 parts of copper phthalocyanine 80 parts of powdered polychloro copper phthalocyanine was employed. The resulting green dispersed paste was of high quality and useful, as described in Example 1, wherever a green pigment instead of blue is desired.

Example 4

Into the equipment employed in Example 1, there was charged:

80 parts of powdered crude copper phthalocyanine containing about 4.5% chlorine
8 parts sulfonated lignin as a dispersing agent
800 grams powdered borax
325 ml. water.

This mixture was stirred at 2500 R. P. M. for about 2 hours, then diluted and decanted from the borax as in Example 1. The pigment suspension was made acid (pH±2.0) with sulfuric acid, boiled for about 30 minutes (no flocculating agent was necessary) filtered and washed free of soluble salts. The paste obtained, when dried and pulverized, comprised a dry color of jet masstone, high strength and excellent intensity of hue.

Example 5

Example 4 was duplicated, except that the sulfonated lignin was replaced with 8 parts of copper phthalocyanine sodium polysulfonate (commercial product of about 50% purity). After milling, separating from the borax and acidifying, the suspension of water-soluble dye was precipitated by adding 10 parts aluminum sulfate $$(Al_2(SO_4)_3.18H_2O)$$

in 100 ml. water. The slurry was boiled, filtered, washed and dried. The pulverized color had good strength and was especially valuable in paint as a fluocculation resistant color.

Example 6

The following charge was milled for 2 hours in the equipment of Example 1:

80 parts powdered (crude) polychloro copper phthalocyanine
50 parts of the dispersing agent employed in Example 1
800 parts borax
325 ml. water.

The charge was diluted to a total volume of about 2000 ml. and separated from most of the borax by decantation. The remainder of the undissolved borax was removed by filtration through #8 cotton duck filter cloth, the dispersed pigment passing readily through the cloth. The resulting pigment suspension was dried directly in an oven to give a dry color containing about 40% color, about 25% dispersing agent, and the remainder borax. The relative amount of borax will vary somewhat with the amount and temperature of the water used for dilution. This dry pigment had the valuable property of readily re-dispersing in water to substantially the same degree of dispersion which was present before drying. Thus one avoids the difficulties inherent in marketing aqueous pastes such as drying out on storage, mold growth, instability to freezing temperatures and the high cost of shipping water.

Products of a similar type heretofore available have usually contained substantial amounts of dextrin or similar polysaccharides to promote their redispersion in water. These also supported mold growth in some systems and were especially objectionable in coloring Portland cement articles because the dextrin delayed the setting of the cement and seriously decreased the structural strength of the article. The products of this example are fully equal in dispersibility to the prior art products, are free from tendencies to support mold growth, and are entirely satisfactory in coloring cement articles.

*Example 7*

Example 1 was duplicated except that 100 parts of powdered dibasic calcium phosphate was used instead of the borax. In view of the calcium present, HCl instead of $H_2SO_4$ was used in the extraction step. The results obtained were similar to those of Example 1.

*Example 8*

120 parts of dichloroisodibenzanthrone in the form of a crude powder are charged to the milling device of Example 1 together with 12 parts of the dispersing agent therein used, 600 parts of powdered borax, and about 250 parts of water. Milling was continued for about one hour under the conditions described in Example 1, followed by dilution and separation from the borax as described therein. After extraction in an acid medium and flocculation with a cationic agent, diphenyl guanidine, the pigment was filtered and washed free of soluble salts to give a violet pigment paste highly useful for coloring aqueous systems of the type enumerated in Example 1, and as a vat dye.

This color was also highly useful for shading phthalocyanine pigments toward a redder shade of blue. Thus a mixture of about 20 parts of the product of this example with 80 parts of the product of Example 2 gives a very desirable reddish blue aqueous paste.

*Example 9*

337 parts of 3,3' dichloro Indanthrone presscake containing 165 parts color solids and consisting of crystals up to 7 microns in the longest dimension were mixed with 41 parts of the sodium salt of naphthalene sulfonic acid polymerized with formaldehyde. This was charged to a mill similar to that of Example 1 operating at about 2450 R. P. M. and 410 parts of powdered borax was then added with the temperature kept below 10° C. Small increments of water were added during milling to maintain fluidity and milling was continued for about 2 hours at which point all particles appeared, under a microscope, to be under 1 micron in the largest dimension. The mass was diluted with about 1500 cc. cold water and the dispersed pigment was removed from the borax by decantation. The dilute suspension was concentrated to about 20% solids by evaporation.

The resulting paste was useful as a vat dyestuff and exhibited superior properties, such as improved freedom from specking, improved machine dyeing and improved speed of reduction when compared to products resulting from the usual acid pasting operation.

*Example 10*

296 parts of a green vat dye presscake comprising 16:17-dimethoxy dibenzanthrone and containing 150 parts color solids were treated with 45 parts of the sodium salt of naphthalene sulfonic acid polymerized with formaldehyde in the equipment of Example 1. While stirring there was added 375 parts of powdered borax and milling was continued for about 2 hours, adding more water as needed to maintain fluidity until all of the dye particles were in the submicron range. Separation from borax and concentration to a standardized paste were carried out as in Example 9. The product exhibited superior freedom from specking in comparison with the former acid pasted standards.

*Example 11*

540 parts of a crude presscake of dibenzanthrone containing 150 parts of color solids were milled as in Examples 9 and 10 but using 45 parts of sulfonated lignin and 375 parts of powdered borax. More water was added as needed to maintain fluidity and milling was continued for about 3 hours until the microscope shows the color particles to be in the submicron range. Separation from the borax and concentration to a standardized paste were carried out as in Example 9 to give a product showing superior properties as a vat dye compared to the former acid pasted standards.

In any process for reducing pigment particle size, there must be some measure of the particle size which results. Many methods have been proposed to accomplish this purpose, including optical microscopy which is of little value because the particle sizes are below the limit of resolution of an optical microscope; electron microscopy which gives an excellent measure of the particles exposed to the electron beam, but since this test must be done on a sample maintained in a vacuum, it can be applied only to a dry product which has been redispersed in a non-volatile vehicle. This always raises a question whether the observation is being made on the sample as it originally existed. Furthermore, it is time consuming and not well adapted to routine control testing. The determination of the specific surface of a powder by gas adsorption gives a measure which can be calculated in terms of average particle diameter making certain assumptions as to particle shape. This method, likewise, requires the use of a vacuum and is very time consuming. Furthermore, it is subject to inaccuracies resulting from the presence of some surface active agents. Methods based on sedimentation rates and the like are applicable to very small particle sizes only when used in connection with a centrifuge and are very time consuming.

A purely subjective test but one of practical importance to the ultimate user of the pigment is the color value or tinctorial strength developed in the pigment. To a large extent, the products of this invention have been evaluated by such a test. The tinting strength of a colored pigment is easily measured by adding a predetermined amount of the pigment dispersed in a vehicle to a white coating composition to determine the ability of such pigment to tint a white pigment in the same vehicle. An excellent discussion of the principles involved and the procedures used in testing colored pigments for tinting strength is found in a publication of Henry A. Gardner's "Physical and Chemical Examination of Paints, Varnishes, Lacquers and Colors," tenth edition (May 1946), pages 35–41. Although the procedures therein are applied specifically to printing ink compositions, it is obvious that the basic principles apply in any type of vehicle, including the testing of aqueous pastes of colored pigments in compositions wherein the vehicle is an aqueous solution or emulsion of a suitable binder such as casein or a rubber latex emulsion.

Although described as applied to certain specific embodiments, the invention is not limited thereto. Thus, while particularly useful in the treatment of the specific pigments and dyes mentioned, the invention is applicable to the treatment of all types of coloring ingredients and especially those of organic type. Its special utility is with the phthalocyanine pigments, specifically copper phthalocyanine and halogenated derivatives, and with vat dyes, whether for use as pigments or in textile dyeing. The phthalocyanine pigments, in addition to copper phthalocyanine and its halogenated derivatives, include metal-free phthalocyanine and other metal phthalocyanines such as those of cobalt and nickel. Examples of other pigments contemplated for treatment include chrome yellows, chrome reds, chrome greens, chrome oranges, iron blue, azo pigments, such as lithol reds, toluidine reds, etc.

The examples have specified that the crude pigment being conditioned should be in the form of a powder when subjected to the process of this invention. Large lumps would be poorly wet by the solution of the dispersing agent and the finely divided inorganic salt used as the grinding aid would be largely ineffective against such particles. Advantageously, the operation is greatly facilitated if the crude pigment is reduced to a powder form, as by pulverizing, before the process is carried out. Pastes containing the crude pigment in water-wet form can also be used, provided they are free of undesirable solvents.

The dispersing agents preferred for use herein comprise (1) the polymerized condensation product of formaldehyde and naphthalene sulfonic acid, (2) lignin sulfonic acids, and (3) copper phthalocyanine sodium polysulfonate. Of these, the first is employed in procuring optimum results hereunder. In the case of the lignin derivatives, two types are available, the one resulting from the direct sulfonation of lignin and the other resulting as a by-product from the sulfite cooking process for obtaining cellulose from wood. Other agents can also be used, including sodium carboxy methyl cellulose, sodium rosinate, and petroleum sulfonates. The amount of dispersing agent used can vary from about 5% to about 60% of the weight of the pigment under treatment, with amounts ranging from about 10% to 30% being preferred for employment.

As indicated, the grinding aid or medium employed herein comprises an inorganic salt which is partially soluble in the aqueous liquid vehicle containing the dispersing agent, and preferably consists of a granular form of a sodium tetraborate, particularly borax of commerce having the formula $Na_2B_4O_7 \cdot 10H_2O$, or can consist of other hydrated tetraborates, such as $Na_2B_4O_7 \cdot 5H_2O$. In addition, dicalcium phosphate can be used, as can sodium chloride, boric acid, sodium sulfate, potassium sulfate, or ammonium chloride. The amount of grinding aid used is variable but, as in the instance of borax, can range from about 3 parts to 10 parts per part of pigment or dye present. Preferably an amount of at least 5 parts per part, by weight, of pigment is used. The amounts to be employed will obviously vary in proportion to the solubility and specific gravity of the grinding media employed as well as with the particle or crystal size thereof. In addition, the ratio of grinding medium to pigment will be significantly altered by the solubility of the salt. In the preferred embodiment of the invention, the amount of undissolved salt should be at least two times the weight of the pigment and the crystal size should not exceed about 60 mesh. In instances where the pentahydrate $Na_2B_4O_7 \cdot 5H_2O$ is employed, it will be found that it tends to take on water to become the decahydrate and may objectionably cake in the process. Accordingly the preferred form of any crystalline salt used is that which will be in equilibrium with water at normal room temperature.

In the examples, powdered borax use is specified and the general terminology of finely divided, inorganic salt is used. No sharp dividing line exists between those products which are effective and those which are not with respect to particle size. Rather, it appears to be a question of efficiency of operation. Products finer than about 60 mesh have proved very satisfactory for use while products of larger crystal size, say, 40 mesh or larger, are less efficient. Such products may cause a substantial amount of particle size reduction but the rate of reduction drops off severely at markedly larger pigment particles than when the finer salt is used.

The type of vessel or machine used in effecting particle size reduction is not critical. Preferably, resort is had to an apparatus capable of batch or continuous type of operation. Thus, it can comprise any known type of open-top, cylindrical vessel, water-jacketed, if desired, provided with one or more motor-driven agitator shafts suspended vertically along its axis on which one or more impellers of any desired shape, such as flat or curved circular discs, pitched propellers, paddles, toothed discs, cylinders, or other stirring means are mounted for rotation at any desired, relatively high, controlled rate of speed. Similarly, a colloid mill with a conical rotor can be employed by repeatedly recirculating the charge to the grinding zone. Other useful apparatus comprises that disclosed in U. S. 2,351,492. Obviously, suitable modifications of the apparatus can be effected so as to enable it to be adapted for continuous operation wherein a suitably prepared mixture of the ingredients can be fed into the grinding chamber with a simultaneous withdrawal of the milled charge at the same rate from another point in the vessel.

While specific agitator speeds have been mentioned and utilized in the examples, these are not critical. However, peripheral speeds in excess of about 2000 ft. per minute have shown good results and such disc speeds are therefore preferred for use. It is believed, however, that the amount of power applied to the pigment is the important factor and that such factors as speed, viscosity, disc diameter, and the like are important only as they make it possible to apply the power to the mixture. To a large extent the time required is a function of the power applied. Obviously the particular speed employed will depend upon the size of the vessel utilized, the type of agitator employed, and the degree of pigment particle size or fineness ultimately desired.

Cooling has been specified in the examples as a means of dissipating the large amount of heat resulting from the power applied in the process. The efficiency of the process drops off markedly at temperatures above about 30° C.–40° C. Hence, the process is preferably operated below these temperatures. This is not a top limit in the process since good results have been obtained at times up to about 60° C. but at lowered efficiency. The high temperature is not believed to have any harmful effect on the pigment, rather it results in solution of some of the grinding reagent such as borax, and a marked reduction in the amount available as the grinding aid. Moreover, the particle size of the borax is a resultant of its tendency to recrystallize in a vigorously stirred charge and this will be a function of temperature so that the higher temperatures result in crystal growth and a lowered efficiency from the larger crystal size.

The reduction of particle size by mechanical means requires the application of energy to the particle to cause it to fracture. The principal problems in such an operation have been to apply the energy at the right place and to make efficient use of the energy applied. In a ball mill, a great proportion of the energy applied is consumed in the lifting of the grinding elements to a position where they may expend a portion of their energy thus acquired in fracturing particles as they fall. One of the advantages of the present process is that it makes a more efficient use of the energy, or the power, applied both by directing it to the particles to be broken and by using less of it in unnecessary work. However, the ability to utilize the power applied depends upon a number of factors, one of which is the viscosity of the liquid medium. It is obvious that it requires more power to rotate any agitator, and particularly a smooth disc, in a viscous liquid than in a thin liquid. Hence, high viscosity promotes the absorption of energy by the system, but an upper limit is imposed by the practical difficulty of obtaining efficient agitation. The lower limit is that point at which the agitator turns so easily that no great amount of work can be done in the system.

We claim as our invention:

1. A process for reducing the particle size of a water-insoluble coloring material comprising subjecting, in the presence of a dispersing agent, a mixture of said material and a finely divided, water-soluble inorganic salt suspended in a saturated aqueous solution of said salt to high energy shear and impact treatment imparted thereto by a surface moving at a high rate of speed with respect to said mixture.

2. A process for reducing the particle size of a water-insoluble coloring material which comprises subjecting, in the presence of a dispersing agent, a mixture of said material and a finely divided, water-soluble inorganic salt, while suspended in a saturated water solution of said salt, to high energy shear and impact treatment through the action of a surface moving at a high rate of speed and until said material becomes reduced in particle size.

3. A method for reducing the particle size of a water-insoluble coloring material comprising subjecting, in the presence of a dispersing agent, a mixture of said material and a sodium tetraborate, while suspended in a body of a saturated aqueous solution of said borate, to high energy shear and impact treatment until said material is reduced in particle size.

4. A process for reducing the particle size of a water-insoluble, organic coloring material comprising subjecting, in the presence of a dispersing agent, a mixture of said material and sodium tetraborate decahydrate suspended in a body of a saturated aqueous solution of said sodium tetraborate to high energy shear and impact treatment imparted by a surface moving at a high rate of speed with respect to said body.

5. A method for reducing the particle size of a crude phthalocyanine pigment comprising subjecting, in the presence of a dispersing agent, a mixture of said pigment and a finely divided water-soluble, inorganic salt suspended in an amount ranging from 3–10 parts by weight per part of said pigment in a body of a saturated aqueous solution of said salt to high energy shear and impact treatment by means of a surface moving at a high rate of speed within said body.

6. A method for reducing the particle size of a crude copper phthalocyanine pigment which comprises subjecting a mixture of said pigment and sodium tetraborate decahydrate while suspended in a saturated aqueous solution of said sodium tetraborate to high energy shear and impact treatment in the presence of from 10% to 30%, based on the weight of the pigment under treatment, of a dispersing agent comprising the polymerized condensation product of formaldehyde and naphthalene sulfonic acid.

7. A method for reducing the particle size of a crude copper phthalocyanine pigment which comprises subjecting a mixture of said pigment and sodium tetraborate decahydrate while suspended in a saturated aqueous solution of said sodium tetraborate to high energy shear and impact treatment in the presence of from 10% to 30%, based on the weight of the pigment under treatment, of a dispersing agent comprising sulfonated lignin.

8. A method for reducing the particle size of a crude copper phthalocyanine pigment which comprises subjecting a mixture of said pigment and sodium tetraborate decahydrate while suspended in a saturated aqueous solution of said sodium tetraborate to high energy shear and impact treatment in the presence of from 10% to 30%, based on the weight of the pigment under treatment, of a dispersing agent comprising copper phthalocyanine polysulfonate.

References Cited in the file of this patent

UNITED STATES PATENTS

| | | |
|---|---|---|
| 1,837,772 | Hailwood et al. | Dec. 22, 1931 |
| 2,065,762 | Stanley | Dec. 29, 1936 |
| 2,138,049 | Vesce | Nov. 29, 1938 |
| 2,192,954 | Sloan et al. | Mar. 12, 1940 |
| 2,213,693 | Davies et al. | Sept. 3, 1940 |
| 2,367,519 | O'Neal | Jan. 16, 1945 |
| 2,556,730 | Graham | June 12, 1951 |
| 2,645,643 | Gottlieb | July 14, 1953 |
| 2,669,569 | Mutaffis | Feb. 16, 1954 |

FOREIGN PATENTS

| | | |
|---|---|---|
| 566,325 | Great Britain | Dec. 22, 1944 |